(12) United States Patent
Yoshida et al.

(10) Patent No.: US 12,257,648 B2
(45) Date of Patent: Mar. 25, 2025

(54) LASER PROCESSING DEVICE

(71) Applicant: MITSUBISHI HEAVY INDUSTRIES, LTD., Tokyo (JP)

(72) Inventors: Kazuhiro Yoshida, Tokyo (JP); Yoshinao Komatsu, Tokyo (JP); Saneyuki Goya, Tokyo (JP); Akiko Inoue, Tokyo (JP); Yasuyuki Fujiya, Tokyo (JP); Ryuichi Narita, Tokyo (JP); Masahiko Shimizu, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 105 days.

(21) Appl. No.: 17/607,131

(22) PCT Filed: Jul. 31, 2019

(86) PCT No.: PCT/JP2019/029934
§ 371 (c)(1),
(2) Date: Oct. 28, 2021

(87) PCT Pub. No.: WO2021/019704
PCT Pub. Date: Feb. 4, 2021

(65) Prior Publication Data
US 2022/0203480 A1 Jun. 30, 2022

(51) Int. Cl.
*B23K 26/364* (2014.01)
*B23K 26/14* (2014.01)
*B23K 26/142* (2014.01)

(52) U.S. Cl.
CPC .......... *B23K 26/364* (2015.10); *B23K 26/142* (2015.10); *B23K 26/1464* (2013.01)

(58) Field of Classification Search
CPC ...... A61M 1/16; A61M 1/1605; A61M 1/342; A61M 1/3434; A61M 1/3437;
(Continued)

(56) References Cited

U.S. PATENT DOCUMENTS 5,321,228 A * 6/1994 Krause ................. B23K 26/144
219/121.84
5,747,771 A * 5/1998 O'Neill ................ B23K 26/142
219/121.84
(Continued)

FOREIGN PATENT DOCUMENTS

EP 0737539 A1 10/1996
JP H1099978 A 4/1998
(Continued)

OTHER PUBLICATIONS

International Search Report and Written Opinion of International Application No. PCT/JP2019/029934 mailed Oct. 15, 2019; 13pp.

*Primary Examiner* — Dana Ross
*Assistant Examiner* — Adam M Eckardt
(74) *Attorney, Agent, or Firm* — HAUPTMAN HAM, LLP

(57) ABSTRACT

This laser processing device is provided with a laser radiating unit which forms a processed groove extending in a scanning direction on a workpiece, by subjecting the workpiece to laser processing while scanning the surface of the workpiece, and a nozzle portion which has a plurality of ejection holes arranged side by side in the scanning direction, and which ejects a gas toward the processed groove from each of the ejection holes. With this laser processing device, since a plume is eliminated by ejecting gas into the processed groove by means of the nozzle portion, the formation of a heat affected layer by the plume can be suppressed to an even greater extent.

5 Claims, 7 Drawing Sheets

(58) Field of Classification Search
CPC .... A61M 1/3451; A61M 1/3465; A61M 1/36; A61M 2205/126; A61M 2205/3334; A61M 2205/3393; A61M 2205/50; A61M 37/00; B23K 26/142; B23K 26/1464; B23K 26/364; B23K 26/08; B23K 26/14; B23K 26/36

See application file for complete search history.

(56) References Cited

U.S. PATENT DOCUMENTS

| | | | | |
|---|---|---|---|---|
| 6,888,853 | B1* | 5/2005 | Jurgensen | B23K 26/0643 |
| | | | | 430/269 |
| 11,810,799 | B2* | 11/2023 | Chung | B23K 26/1464 |
| 2012/0219031 | A1* | 8/2012 | Tokiwa | B23K 26/142 |
| | | | | 372/58 |
| 2016/0101483 | A1 | 4/2016 | Kawada et al. | |
| 2017/0136576 | A1* | 5/2017 | Ashihara | B08B 5/02 |
| 2019/0217414 | A1* | 7/2019 | Hong | B23K 37/047 |

FOREIGN PATENT DOCUMENTS

| | | |
|---|---|---|
| JP | 2000225486 A | 8/2000 |
| JP | 2002524263 A | 8/2002 |
| JP | 2003251486 A | 9/2003 |
| JP | 2011036865 A | 2/2011 |
| JP | 2014226706 A | 12/2014 |
| JP | 2017124438 A | 7/2017 |
| JP | 2017154145 A | 9/2017 |
| WO | 2011151451 A1 | 12/2011 |

* cited by examiner

LASER PROCESSING DEVICE

RELATED APPLICATIONS

The present application is a National Phase of International Application Number PCT/JP2019/029934 filed Jul. 31, 2019.

TECHNICAL FIELD

The present disclosure relates to a laser processing device.

BACKGROUND ART

As an example, a processing device that uses irradiation of laser light is used in cutting a metal material (for example, PTL 1 below). The laser processing device configured in this way has a light source and a galvanometer mirror that reflects a laser generated by the light source. An irradiation range of the laser light can be moved by changing a posture of the galvanometer mirror. That is, thermal energy of the laser light can be transmitted to a workpiece by moving the laser on (scanning) a surface of the workpiece, and machining can be performed on the workpiece.

Here, it is known that a plume is generated when the laser processing is performed as described above. When the plume is generated, a cutting surface (processing groove) of the workpiece may be degenerated due to an exposure to a high temperature of the plume, and a heat-affected layer may be formed on the cutting surface. In addition, in some cases, a carbon fiber reinforced resin (CFRP) may be processed by the above-described laser processing device. When the laser processing is performed on the CFRP, a resin component is dropped out or carbonized, thereby forming the heat-affected layer. When the CFRP is applied to a product, the heat-affected layer is removed in general.

CITATION LIST

Patent Literature

[PTL 1] Japanese Unexamined Patent Application Publication No. 2011-36865

SUMMARY OF INVENTION

Technical Problem

However, a laser processing device in the related art has the following problems. Due to the generated plume, accuracy in processing the product is degraded, or the number of man-hours for removing the heat-affected layer from the workpiece is increased.

The present disclosure is made to solve the above-described problems, and an object thereof is to provide a laser processing device capable of further suppressing formation of a heat-affected layer.

Solution to Problem

According to the present disclosure, in order to solve the above-described problems, there is provided a laser processing device including a laser irradiation unit that forms a processing groove extending in a scanning direction on a workpiece by performing laser processing on the workpiece while scanning a surface of the workpiece, and a nozzle unit that has a plurality of ejection holes aligned in the scanning direction to eject gas toward the processing groove from each of the ejection holes.

Advantageous Effects of Invention

According to a laser processing device of the present disclosure, formation of a heat-affected layer can be further suppressed.

DESCRIPTION OF EMBODIMENTS

First Embodiment (Configuration of Laser Processing Device)

Figure 1:
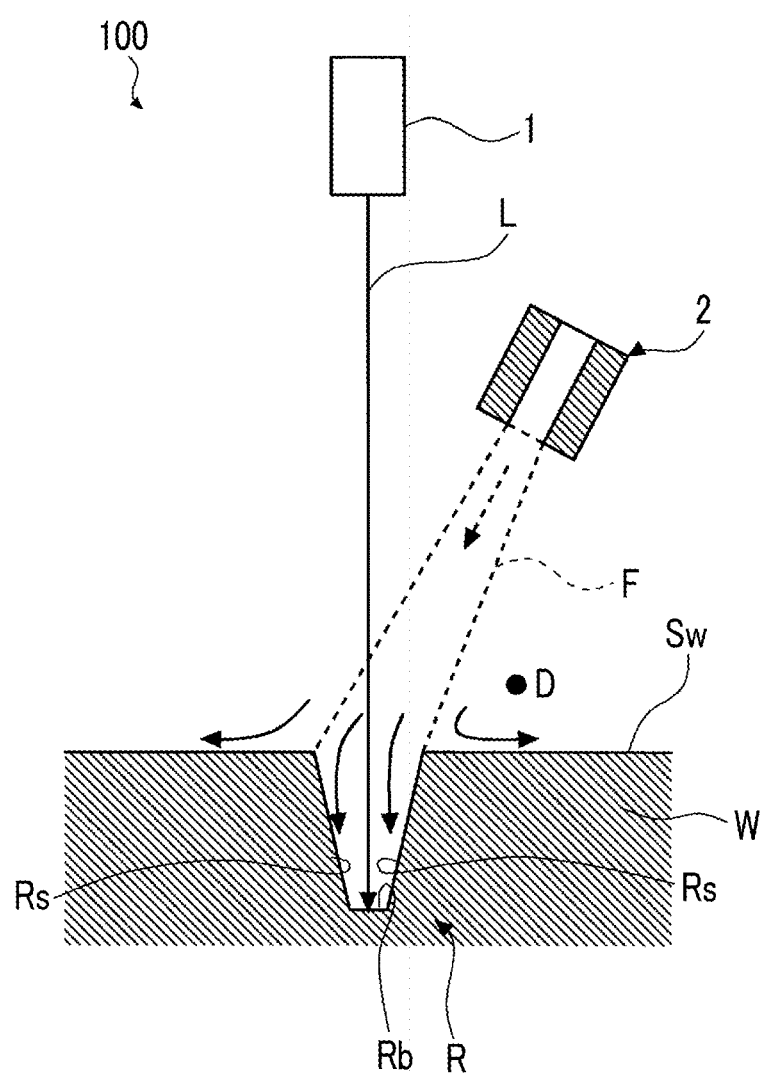
FIG. 1 is a cross-sectional view illustrating a configuration of a laser processing device according to a first embodiment of the present disclosure.
Figure 2:
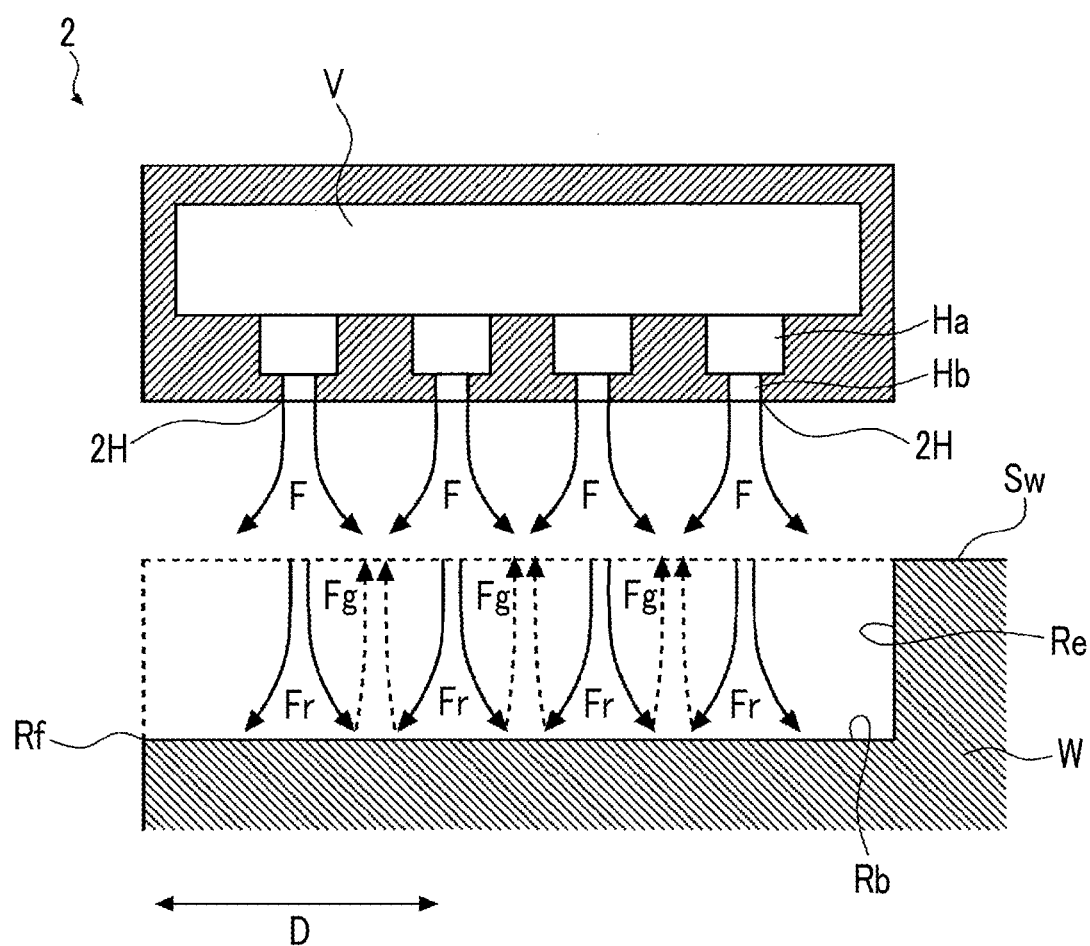
FIG. 2 is a cross-sectional view illustrating a configuration of a nozzle unit according to the first embodiment of the present disclosure.

Hereinafter, a laser processing device 100 according to a first embodiment of the present disclosure will be described with reference to FIGS. 1 to 3. The laser processing device 100 is used for performing laser processing including machining or grooving on a workpiece W formed of a metal material or a carbon fiber reinforced resin (CFRP), for example. As illustrated in FIG. 1, the laser processing device 100 includes a laser irradiation unit 1 and a nozzle unit 2.

The laser irradiation unit 1 irradiates a surface of the workpiece W (workpiece surface Sw) with laser light L to form a processing groove R on the workpiece surface Sw. The laser irradiation unit 1 is disposed at a position where the workpiece W can be irradiated with the laser light from vertically above. The term "vertically above" as used herein refers to a substantially vertical direction, and manufacturing errors and tolerances are allowed. The laser irradiation unit 1 causes the laser light L to reciprocate (perform scanning) on the workpiece surface Sw in a predetermined direction (hereinafter, referred to as a scanning direction D). In this manner, the processing groove R is formed by thermal energy of the laser light L. As the number of reciprocating times of the laser light L increases, a depth of the processing groove R gradually increases. The laser irradiation unit 1 can also be configured to linearly irradiate the workpiece surface Sw only once with the laser light L (that is, configured not to reciprocate). Furthermore, the laser irradiation unit 1 can be configured to irradiate the workpiece surface Sw with the laser light L multiple times in only one direction.

Figure 3:
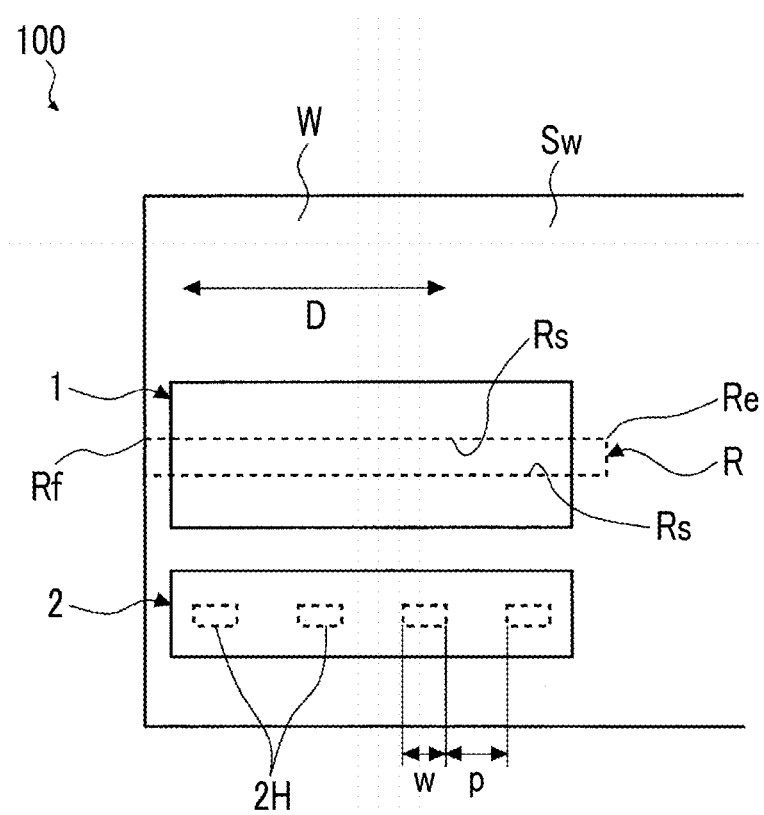
FIG. 3 is a top view illustrating a configuration of the laser processing device according to the first embodiment of the present disclosure.

In an example of FIG. 1 or 3, the processing groove R has a linear shape extending in the scanning direction D on the workpiece surface Sw. Furthermore, as illustrated in FIG. 1, a bottom surface Rb of the processing groove R has a planar shape. A side surface Rs of the processing groove R spreads in a direction intersecting with the bottom surface Rb. That is, the processing groove R has a rectangular (more specifically, V-shaped or trapezoidal) cross section, when viewed in an extending direction of the processing groove R. The processing groove R may extend in a curved shape.

The nozzle unit 2 is provided to supply a flow of gas (ejection flow F) to the processing groove R in a state of being irradiated with the laser light L. The nozzle unit 2 is disposed at a position that does not interfere with the laser light L, when viewed in the scanning direction D. More specifically, the nozzle unit 2 ejects the gas (ejection flow F) to form an angle of 45° or more with respect to the workpiece W (workpiece surface Sw), when viewed in the scanning direction D. More preferably, the angle of the ejection flow F is 60° or larger. Most preferably, the angle of the ejection flow F is 85°.

Subsequently, a configuration of the nozzle unit 2 will be described in detail with reference to FIGS. 2 and 3. As illustrated in the drawings, a space V and a plurality of ejection holes 2H communicating with the space V are formed inside the nozzle unit 2. Compressed gas supplied from an external supply source (not illustrated) circulates in the space V. The plurality of ejection holes 2H are aligned at an interval in the scanning direction D, when viewed in a horizontal direction orthogonal to the scanning direction D. In an example in FIG. 2, an example having four ejection holes 2H is illustrated. However, the number of the ejection holes 2H is not limited to four.

Each of the ejection holes 2H has an enlarged portion Ha located on the space V side and a reduced portion Hb located on the workpiece W side from the enlarged portion Ha. A flow path cross-sectional area of the enlarged portion Ha is larger than a flow path cross-sectional area of the reduced portion Hb. An upper end portion of the enlarged portion Ha communicates with the space V. An upper end portion of the reduced portion Hb communicates with the enlarged portion Ha. A lower end portion of the reduced portion Hb is open downward toward the workpiece W. The ejection hole 2H does not necessarily have the enlarged portion Ha and the reduced portion Hb. For example, the ejection hole 2H may be configured to have a trapezoidal cross section formed by continuously reducing an opening diameter from the space V toward the workpiece W.

As illustrated in FIG. 3, each of the ejection holes 2H has a rectangular cross-sectional shape. Here, $p > w$ is satisfied, when a dimension of the ejection holes 2H in the longitudinal direction (that is, a dimension in the scanning direction D) is defined as $w$ and an interval between a pair of the ejection holes 2H adjacent to each other is defined as $p$.

Subsequently, an operation of the laser processing device 100 according to the present embodiment will be described. In operating the laser processing device 100, the workpiece surface Sw is first irradiated with the laser light L. The workpiece surface Sw is irradiated with the laser light L to form the above-described processing groove R on the workpiece surface Sw. Specifically, as illustrated in FIG. 2 or 3, the processing groove R extending toward a tip portion Re is formed from a starting end portion Rf which is an end surface of the workpiece W toward one side in the scanning direction D of the laser light L. During this process, the bottom surface Rb and the side surface Rs (refer to FIG. 3) are formed inside the processing groove R.

Incidentally, it is known that a plume is generated when laser processing is performed. When the plume is generated, a cutting surface (processing groove R) of the workpiece W may be degenerated due to an exposure to a high temperature of the plume, and a heat-affected layer may be formed on the cutting surface. In addition, in some cases, a carbon fiber reinforced resin (CFRP) may be processed by the above-described laser processing device 100. When the laser processing is performed on the CFRP, a resin component is dropped out or carbonized, thereby forming the heat-affected layer. When the CFRP is applied to a product, the heat-affected layer is removed in general. In other words, in order to remove the heat-affected layer, there is a possibility that a manufacturing cost may increase or a work period may be prolonged.

Therefore, the present embodiment adopts a configuration as follows. The above-described nozzle unit 2 supplies the ejection flow F into the processing groove R so that the laser processing is performed and the plume is removed at the same time. As illustrated in FIG. 2, the ejection flow F flows from the plurality of ejection holes 2H toward the processing groove R via the space V of the nozzle unit 2. A portion of the ejection flow F does not flow into the processing groove R, and flows outward away along the workpiece surface Sw. On the other hand, a residual component of the ejection flow F flows into the processing groove R, thereby forming an internal flow Fr. The internal flow Fr flows toward the bottom surface Rb from the workpiece surface Sw side. A pressure of the internal flow Fr increases when the internal flow Fr collides with the bottom surface Rb, and forms a collision jet flow flowing in the extending direction of the processing groove R. The collision jet flow and another collision jet flow formed by a jet flow from the adjacent ejection holes 2H collide with each other. In this manner, a flow direction is reversed to an upward direction. In this manner, a flow (scavenging flow Fg) flowing upward from the processing groove R is formed. Following the scavenging flow Fg, the plume staying inside the processing groove R is discharged outward of the processing groove R.

As described above, according to the above-described configuration, a high temperature plume generated inside the processing groove R can be blown outward by the gas ejected from the nozzle unit 2. In particular, the plurality of ejection holes 2H of the nozzle unit 2 are aligned in the scanning direction D of the laser irradiation unit 1. In this manner, the plume generated inside the processing groove R can be blown over an entire region in the extending direction of the processing groove. In this manner, it is possible to suppress thermal influence of the plume on an inner surface of the processing groove.

More specifically, according to the above-described configuration, the plume generated inside the processing groove R can be blown outward of the processing groove R by the scavenging flow Fg formed between the ejection flows F. In this manner, it is possible to suppress thermal influence of the plume on an inner surface of the processing groove. That is, it is not necessary to separately provide a dedicated device for forming the scavenging flow Fg. Therefore, a manufacturing cost and a maintenance cost of the laser processing device 100 can be reduced.

Furthermore, in the above-described configuration, the scanning direction D of the ejection holes 2H is the longitudinal direction, and an interval between the ejection holes 2H adjacent to each other is larger than a dimension of the ejection holes 2H in the longitudinal direction. In this manner, the scavenging flow Fg directed outward of the processing groove R can be formed by reversing the ejection flows F on the bottom surface Rb of the processing groove R between the ejection flows F supplied from the ejection holes 2H. In this manner, the plume generated inside the processing groove R can be blown outward of the processing groove R. As a result, it is possible to suppress the thermal influence of the plume on the inner surface of the processing groove R.

In addition, in the above-described configuration, the laser irradiation unit 1 is configured to irradiate the workpiece W with the laser light L from vertically above. The nozzle unit 2 is configured to eject the gas to form an angle of 45° or larger and 85° or smaller with respect to the workpiece W, when viewed in the scanning direction D. According to the above-described configuration, the ejection flow F can be stably supplied into the processing groove R while the laser irradiation unit 1 and the nozzle unit 2 are prevented from interfering with each other. In this manner, the plume generated inside the processing groove R can be blown outward of the processing groove R. As a result, it is possible to suppress the thermal influence of the plume on the inner surface of the processing groove R.

Second Embodiment

Figure 4:
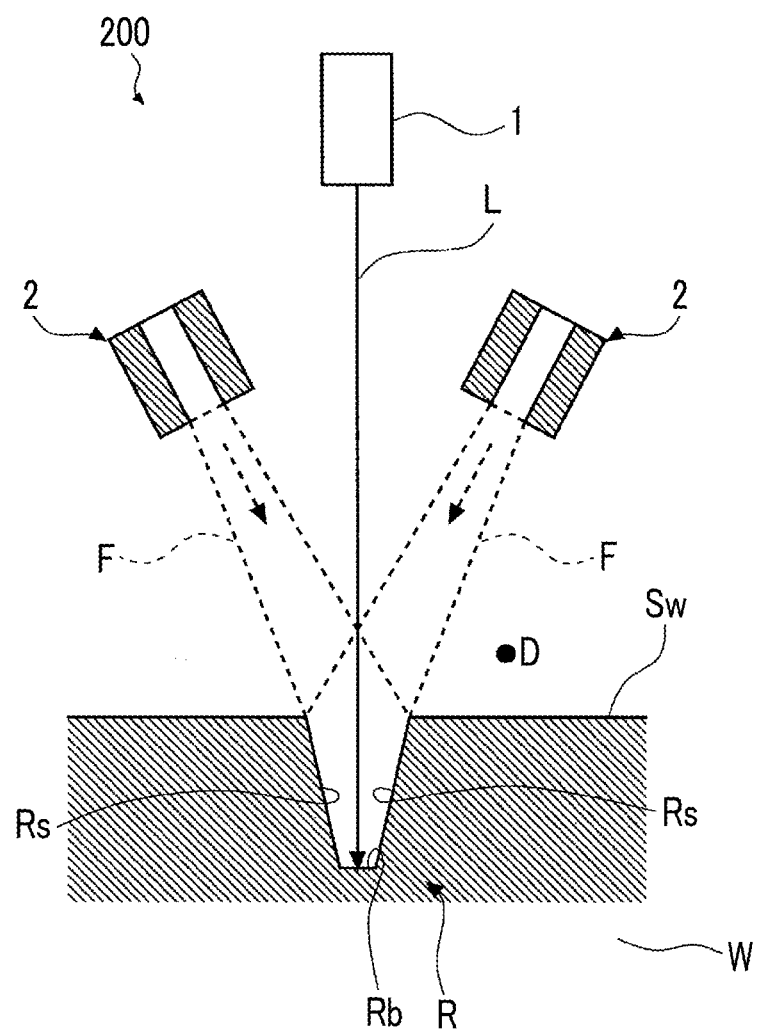
FIG. 4 is a cross-sectional view illustrating a configuration of a laser processing device according to a second embodiment of the present disclosure.

Next, a second embodiment of the present disclosure will be described with reference to FIG. 4. The same reference numerals will be assigned to configurations the same as those in the first embodiment, and detailed description thereof will be omitted. As illustrated in FIG. 4, a laser processing device 200 according to the present embodiment is different from that according to the first embodiment in that a plurality of (two) the nozzle units 2 are provided.

The laser irradiation unit 1 is configured to irradiate the workpiece W with the laser light L from vertically above. The two nozzle units 2 are provided on both sides in the horizontal direction (that is, the width direction of the processing groove R) orthogonal to the scanning direction D while the laser irradiation unit 1 is interposed therebetween. Each of the nozzle units 2 supplies the ejection flow F toward the processing groove R.

According to the above-described configuration, the nozzle units 2 are provided on both sides of the processing groove R in the width direction while the laser irradiation unit 1 is interposed therebetween. In this manner, the gas can be stably supplied into the processing groove R from both sides in the width direction. Therefore, the plume generated inside the processing groove R can be more positively blown outward of the processing groove R. As a result, it is possible to further suppress the thermal influence of the plume on the inner surface of the processing groove R. Furthermore, according to the above-described configuration, the pressure of the jet flow (internal flow Fr) flowing into the processing groove R increases when the jet flow collides with the bottom surface Rb, thereby forming the collision jet flow flowing in the extending direction of the processing groove R. The collision jet flow and another collision jet flow formed by a jet flow from the adjacent ejection holes 2H collide with each other. In this manner, a flow direction is reversed to an upward direction. In this manner, a flow (scavenging flow Fg) flowing upward from the processing groove R is formed. Following the scavenging flow Fg, the plume staying inside the processing groove R can be positively discharged outward of the processing groove R.

Third Embodiment

Figure 5:
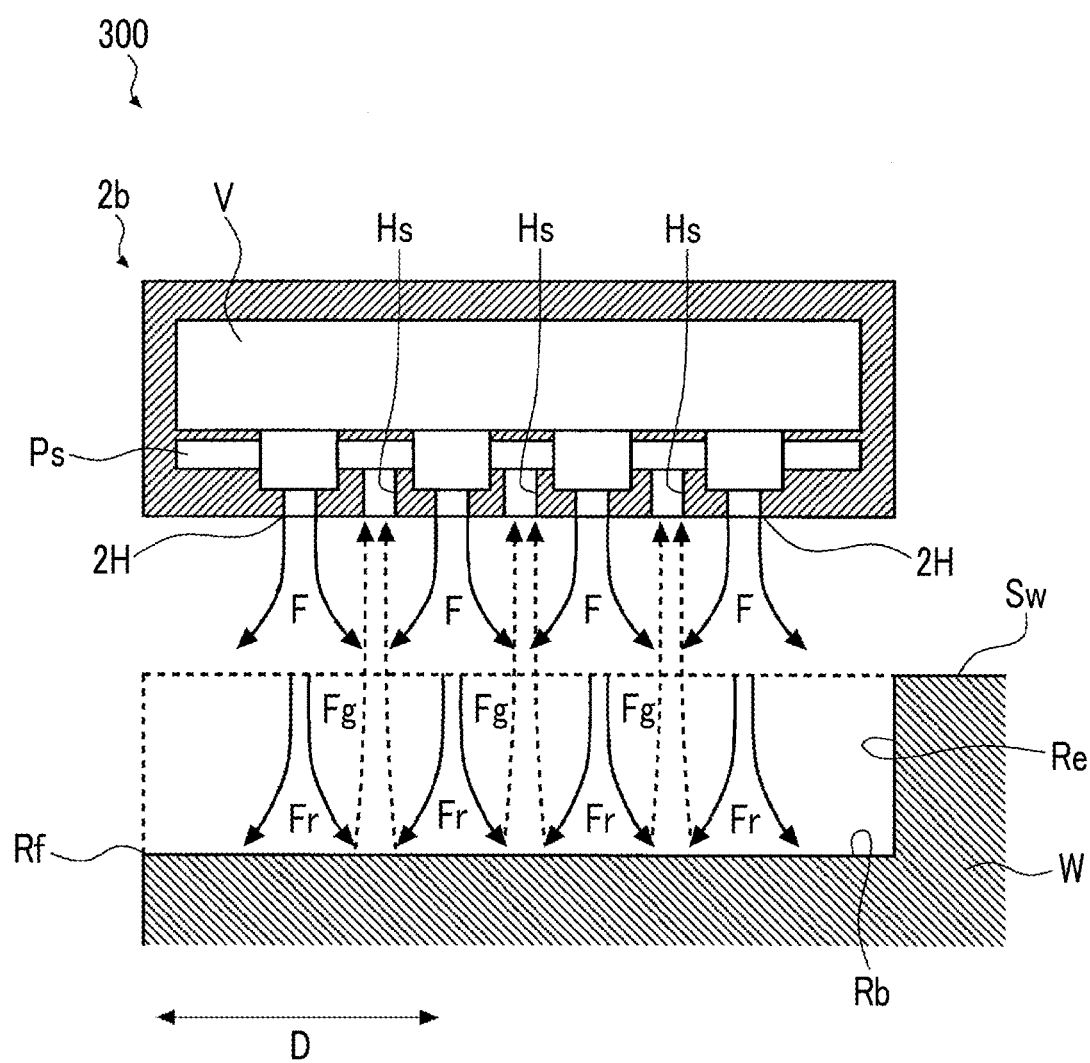
FIG. 5 is a cross-sectional view illustrating a configuration of a laser processing device according to a third embodiment of the present disclosure.
Figure 6:
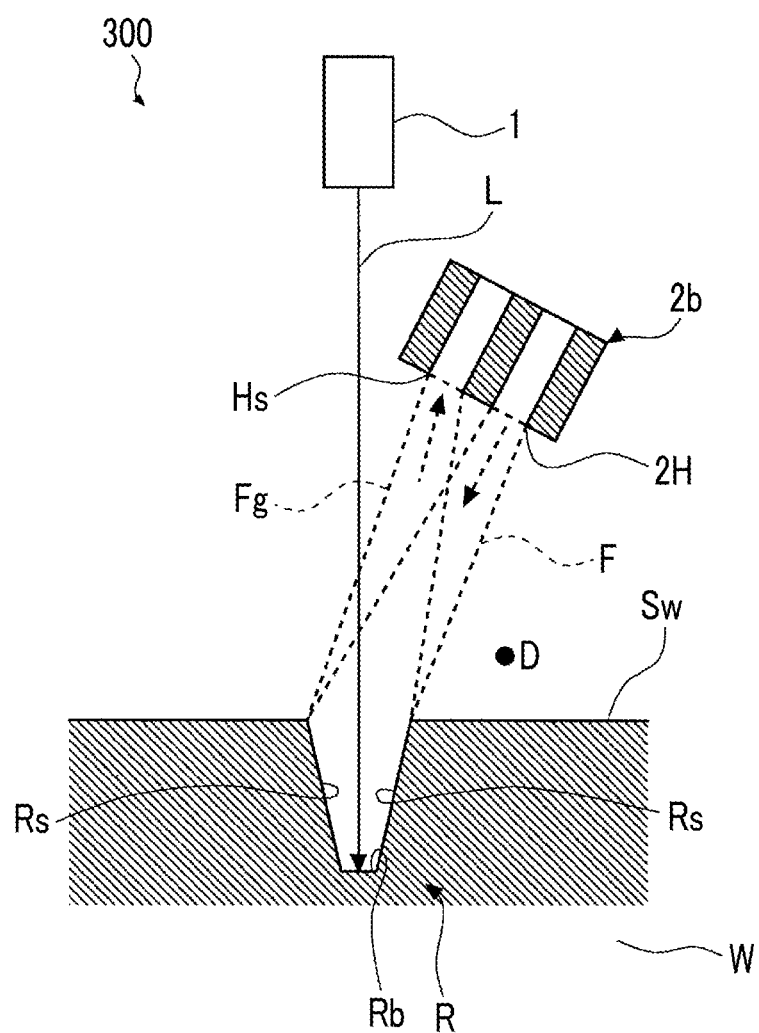
FIG. 6 is a cross-sectional view illustrating a configuration of a nozzle unit according to the third embodiment of the present disclosure.
Figure 7:
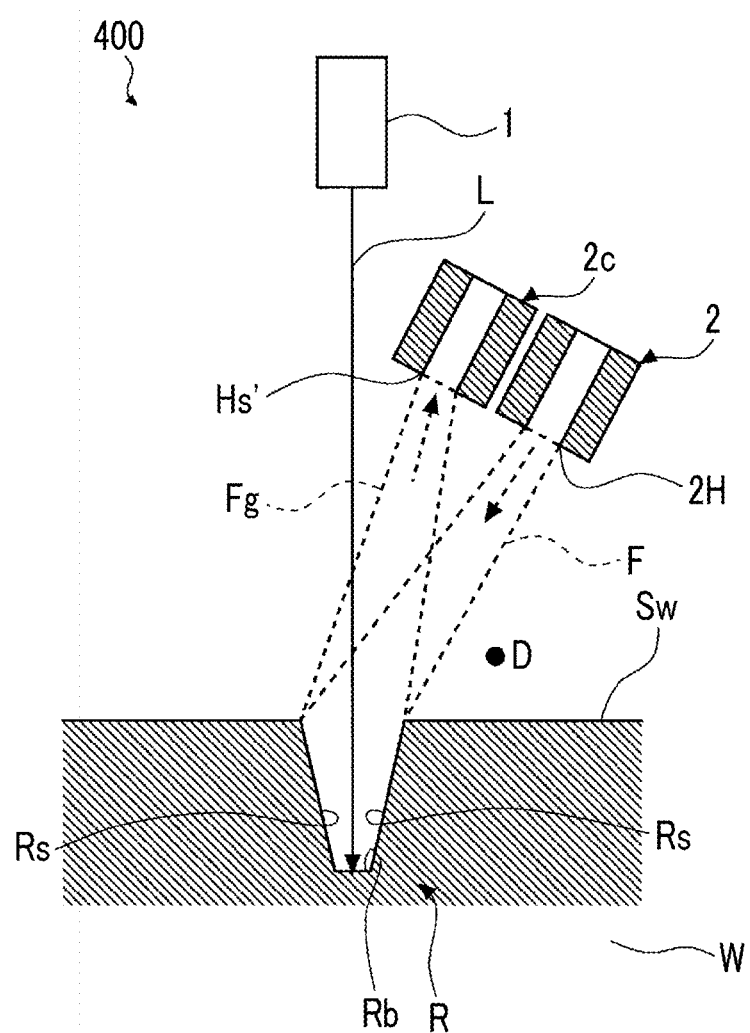
FIG. 7 is a cross-sectional view illustrating a modification example of the nozzle unit according to the third embodiment of the present disclosure.

Subsequently, a third embodiment of the present disclosure will be described with reference to FIGS. 5 and 6. The same reference numerals will be assigned to configurations the same as those in each of the above-described embodiments, and detailed description thereof will be omitted. In a laser processing device 300 according to the present embodiment, a configuration of the nozzle unit 2b is different from that of each of the above-described embodiments. As illustrated in FIGS. 5 and 6, in addition to the space V and the ejection hole 2H which are described above, a suction flow path Ps and a suction hole Hs are formed in the nozzle unit 2b. The suction flow path Ps is formed independently of the space V and the ejection hole 2H. The suction flow path Ps is connected to a negative pressure pump (not illustrated) provided outside. A lower end portion of the suction holes Hs is open to a portion between the ejection holes 2H. An upper end portion of the suction hole Hs communicates with the suction flow path Ps.

According to the above-described configuration, the scavenging flow Fg including the plume transported from the inside of the processing groove R can be stably suctioned by the suction hole Hs formed in the nozzle unit 2b. In this manner, it is possible to reduce a possibility that the scavenging flow Fg may stay inside the processing groove R. As a result, it is possible to further suppress the thermal influence of the plume on the inner surface of the processing groove R.

Another Embodiment

Hitherto, the embodiments of the present disclosure have been described in detail with reference to the drawings. However, specific configurations are not limited to the above-described embodiments, and design changes within the scope not departing from the concept of the present disclosure are also included.

For example, in the above-described third embodiment, as illustrated in FIGS. 5 and 6, the configuration has been described in which the ejection hole 2H and the suction hole Hs are formed in the nozzle unit 2b. However, as illustrated in FIG. 6, a configuration can be adopted in which a suction nozzle unit 2c having only a suction hole Hs' is provided separately from the nozzle unit 2 having only the ejection hole 2H as described in the first embodiment.

APPENDIX

The laser processing device described in each of the embodiments can be understood as follows, for example.

(1) The laser processing device 100 according to a first aspect includes the laser irradiation unit 1 that forms the processing groove R extending in the scanning direction D on the workpiece W by performing the laser processing on the workpiece W while scanning the surface Sw of the workpiece W, and the nozzle unit 2 that has the plurality of ejection holes 2H aligned in the scanning direction D to eject the gas toward the processing groove R from each of the ejection holes 2H.

According to the above-described configuration, the high temperature plume generated inside the processing groove R can be blown by the gas ejected from the nozzle unit 2. In particular, the plurality of ejection holes 2H of the nozzle unit 2 are aligned in the scanning direction D of the laser irradiation unit 1. In this manner, the plume generated inside the processing groove R can be blown over the entire region in the extending direction of the processing groove R. In this manner, it is possible to suppress the thermal influence of the plume on the inner surface of the processing groove R.

(2) In the laser processing device 100 according to a second aspect, between ejection flows F ejected from the ejection holes 2H inside the processing groove R, an interval between the ejection holes 2H is set so that the scavenging flow Fg formed by reversing the ejection flows F on the bottom surface Rb of the processing groove R is formed.

According to the above-described configuration, the plume generated inside the processing groove R can be blown outward of the processing groove R by the scavenging flow Fg formed between the ejection flows F. In this manner, it is possible to suppress the thermal influence of the plume on the inner surface of the processing groove R. That is, it is not necessary to separately provide a dedicated device for forming the scavenging flow Fg. Therefore, a manufacturing cost and a maintenance cost of the laser processing device 100 can be reduced.

(3) In the laser processing device 100 according to a third aspect, the scanning direction D of each of the ejection holes 2H is the longitudinal direction, and the interval between the ejection holes 2H adjacent to each other is larger than the dimension of the ejection hole 2H in the longitudinal direction.

According to the above-described configuration, the scavenging flow Fg directed outward of the processing groove R can be formed between the ejection flows F supplied from the ejection holes 2H by reversing the ejection flows F on the bottom surface Rb of the processing groove R. In this manner, the plume generated inside the processing groove R can be blown outward of the processing groove R. As a result, it is possible to suppress the thermal influence of the plume on the inner surface of the processing groove R.

(4) In the laser processing device 100 according to a fourth aspect, the laser irradiation unit 1 is configured to irradiate the workpiece W with the laser light L from vertically above, and the nozzle unit 2 is configured to eject the gas to form the angle of 45° or larger and 85° or smaller with respect to the workpiece W, when viewed in the scanning direction D.

According to the above-described configuration, the ejection flow F can be stably supplied into the processing groove R while the laser irradiation unit 1 and the nozzle unit 2 are prevented from interfering with each other. In this manner, the plume generated inside the processing groove R can be blown outward of the processing groove R. As a result, it is possible to suppress the thermal influence of the plume on the inner surface of the processing groove R.

(5) In the laser processing device 200 according to a fifth aspect, the laser irradiation unit 1 is configured to irradiate the workpiece W with the laser light L from vertically above, and the nozzle units 2 are provided on both sides in the horizontal direction orthogonal to the scanning direction D while the laser irradiation unit 1 is interposed therebetween.

According to the above-described configuration, the nozzle units 2 are provided on both sides of the processing groove R in the width direction while the laser irradiation unit 1 is interposed therebetween. In this manner, the gas can be stably supplied into the processing groove R from both sides in the width direction. Therefore, the plume generated inside the processing groove R can be more positively blown outward of the processing groove R. As a result, it is possible to further suppress the thermal influence of the plume on the inner surface of the processing groove R.

(6) In the laser processing device 300 according to a sixth aspect, the nozzle unit 2b further has the suction hole Hs provided between the plurality of ejection holes 2H and suctioning the scavenging flow Fg.

According to the above-described configuration, the scavenging flow Fg including the plume transported from the inside of the processing groove R can be stably suctioned by the suction hole Hs formed in the nozzle unit 2b. In this manner, it is possible to reduce a possibility that the scavenging flow Fg may stay inside the processing groove R. As a result, it is possible to further suppress the thermal influence of the plume on the inner surface of the processing groove R.

(7) The laser processing device 400 according to a seventh aspect further includes the suction nozzle unit 2c provided separately from the nozzle unit 2b and having the plurality of suction holes Hs' for suctioning the scavenging flow Fg.

According to the above-described configuration, the scavenging flow Fg including the plume transported from the inside of the processing groove R can be stably suctioned by the suction nozzle unit 2c. In this manner, it is possible to reduce a possibility that the scavenging flow Fg may stay inside the processing groove R. As a result, it is possible to further suppress the thermal influence of the plume on the inner surface of the processing groove R.

INDUSTRIAL APPLICABILITY

In the above-described laser processing device 100, the gas is ejected into the processing groove R by the nozzle unit 2 to remove the plume. Therefore, the formation of the heat-affected layer by the plume can be further suppressed.

REFERENCE SIGNS LIST 100, 200, 300, 400: Laser processing device
1: Laser irradiation unit
2, 2b: Nozzle unit
2c: Suction nozzle unit
2H: Ejection hole
D: Scanning direction
F: Ejection flow
Fg: Scavenging flow
Fr: Internal flow
Ha: Enlarged portion
Hb: Reduced portion
Hs, Hs': Suction hole
L: Laser light
Ps: Suction flow path
R: Processing groove
Rb: Bottom surface
Re: Tip portion
Rf: Starting end portion
Rs: Side surface
Sw: Workpiece surface
V: Space
W: Workpiece

The invention claimed is:
1. A laser processing device comprising:
a laser irradiation unit that forms a processing groove extending in a scanning direction on a workpiece by performing laser processing on the workpiece while scanning a surface of the workpiece; and a nozzle unit that has a plurality of ejection holes aligned in the scanning direction to eject gas as an ejection flow toward the processing groove from each of the ejection holes, wherein the nozzle unit has a plurality of suction holes, the plurality of suction holes are provided along the scanning direction, each of the plurality of suction holes is provided between each pair of adjacent ejection holes and which suctions a scavenging flow formed by reversing the ejection flows on a bottom surface of the processing groove, a space is formed inside the nozzle unit, and each of the plurality of ejection holes communicates with the space.

2. The laser processing device according to claim 1, wherein the scanning direction of each of the ejection holes is a longitudinal direction, and an interval between the ejection holes adjacent to each other is larger than a dimension of the ejection hole in the longitudinal direction.

3. The laser processing device according to claim 1, wherein the laser irradiation unit is configured to irradiate the workpiece with laser light from vertically above, and the nozzle unit is configured to eject the gas to form an angle of 45° or larger and 85° or smaller with respect to the workpiece, when viewed in the scanning direction.

4. The laser processing device according to claim 1, wherein the laser irradiation unit is configured to irradiate the workpiece with laser light from vertically above, and the nozzle units are provided on both sides in a horizontal direction orthogonal to the scanning direction while the laser irradiation unit is interposed therebetween.

5. The laser processing device according to claim 1, further comprising:

a suction nozzle unit provided separately from the nozzle unit and having a plurality of second suction holes for suctioning the scavenging flow.

\* \* \* \* \*